Oct. 24, 1967   J. A. HERON   3,348,605
METHOD AND APPARATUS FOR FORMING CAST OBJECTS
USING EXPENDABLE PATTERNS
Original Filed Dec. 16, 1963   7 Sheets-Sheet 1

United States Patent Office 3,348,605
Patented Oct. 24, 1967

3,348,605
METHOD AND APPARATUS FOR FORMING CAST OBJECTS USING EXPENDABLE PATTERNS
John Aherne Heron, Farnham Royal Lodge, near Slough, England
Continuation of application Ser. No. 331,023, Dec. 16, 1963. This application Aug. 22, 1966, Ser. No. 574,255
Claims priority, application Great Britain, Dec. 19, 1962, 47,967/62; Apr. 19, 1963, 15,632/63
11 Claims. (Cl. 164—26)

This application is a continuation of application Ser. No. 331,023, filed Dec. 16, 1963, and now abandoned.

This invention concerns a method of and apparatus for forming cast objects using expendable patterns.

According to one aspect of the present invention there is provided a method of substantially continuously forming a succession of cast objects, one after the other, comprising the following steps:

(a) Substantially continuously forming, one after the other, a succession of expendable patterns of the objects to be formed, (b) Substantially continuously passing said succession of expendable patterns, one after the other, through means for forming a shell mould about each said pattern.

(c) Substantially continuously passing said succession of expendable patterns, with their shell moulds, one after the other through firing means for firing said shell moulds and melting means for melting out the expendable pattern from each said shell mould.

(d) Substantially continuously filling the succession of empty, fired, shell moulds, one after the other, with molten metal and (e) Removing each shell mould from its cast object when the metal has set.

According to another aspect of the present invention, there is provided apparatus for forming cast objects by the method set forth above, said apparatus comprising forming means for substantially continuously forming one after the other, a succession of expendable patterns of the objects to be formed, means for conveying said expendable patterns one after the other, from said forming means through means for substantially continuously forming shell moulds about said succession of expendable patterns, means for conveying said succession of expendable patterns with their shell moulds one after the other through melting means for melting out said expendable patterns from said shell moulds, and through firing means for firing said shell moulds, means for substantially continuously filling with molten metal the succession of empty, fired shell moulds issuing, one after the other, from said firing means, and means for removing each cast object from its shell mould when the metal has set.

The invention also includes a cast object made by the method or with the apparatus set forth above.

The invention is illustrated, merely by way of example, in the accompanying drawings in which.

Figures 1, 2:
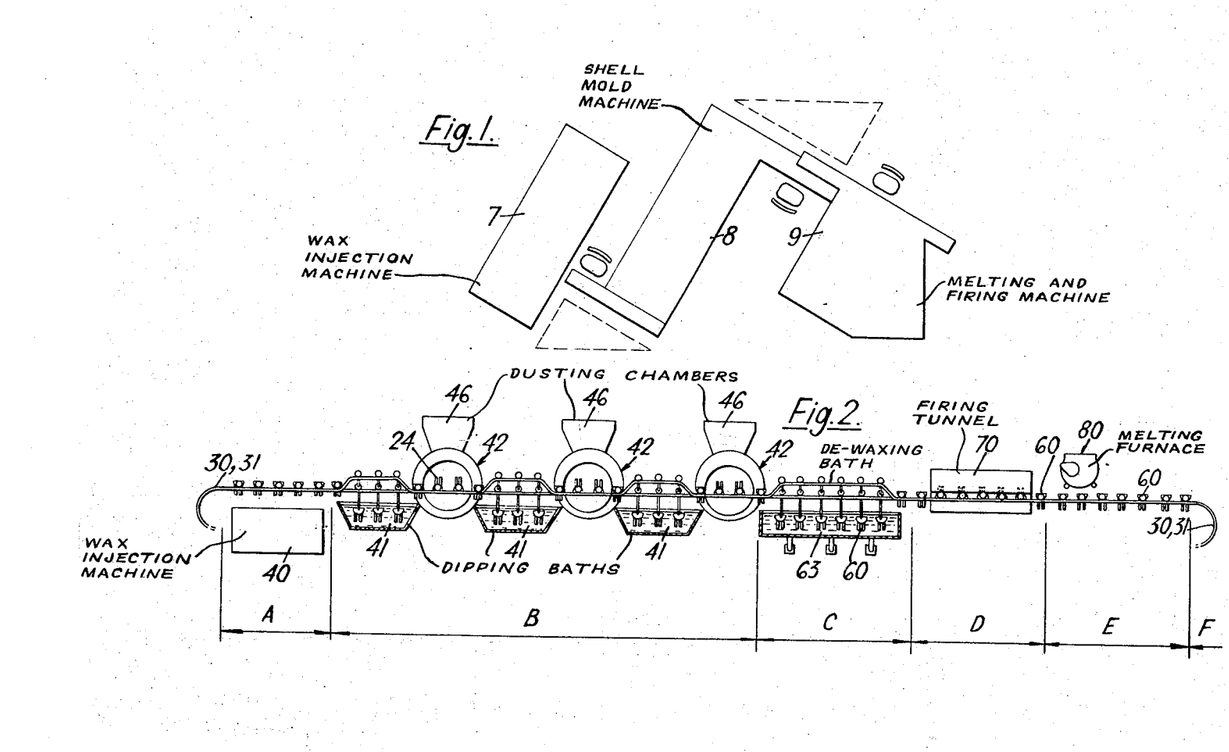
FIGURE 1 is a general layout of apparatus according to the present invention.
FIGURE 2 is a diagrammatic elevation of apparatus according to the present invention.

Referring to the drawings, FIGURE 1 shows a typical lay-out of apparatus for forming cast objects by a substantially continuous process and comprises an automatic wax injection machine 7 in which molten wax is injected into a die or dies (not shown) having moulding surfaces corresponding to the shape of expendable patterns (not shown in FIG. 1) of objects to be cast. The die or dies also include all riser, feeder and runner bars which may be needed in the subsequent casting process described hereinafter. When set, the solid wax patterns are removed from the metal die or dies in the machine 7, and the patterns are sent through a shell mould making machine 8.

The expendable wax patterns entering the shell mould making machine 8 are carried on a substantially continuously moving belt which dips them one after the other into a refractory slip of comminuted refractory material suspended in a refractory binder such as ethyl silicate. The dipped expendable wax patterns are then removed from the slip and dusted with a powder of refractory material, and are then allowed to dry. The dipping, dusting and drying process can be repeated one or more times until there is formed around each expendable wax pattern a shell mould which may be for example ⅜₁₆" thick. The expendable wax patterns with their shell moulds around them are then passed one by one in a substantially continuous stream through a further machine 9. In the machine 9, each expendable wax pattern is melted out of its respective shell mould, the shell mould is fired in a furnace (not shown) and the shell mould is then filled with molten metal. The shell moulds then pass onto a casting machine (not shown).

Referring to FIGURE 2, there is shown, in more detail, but in diagrammatic form, one form of apparatus for substantially continuously forming a succession of cast objects, one after the other, in which the following steps are effected in the areas indicated:

Area A.—Expendable wax patterns of the object to be formed are made and attached to a conveyor.

Area B.—Shell moulds are formed about each wax pattern by conveying the wax pattern through alternate baths and stuccoing apparatus, three stages being shown in FIGURE 1.

Area C.—The wax patterns are melted out of the shell moulds in a hot water bath.

*Area D.*—The empty shell moulds are fired by being passed through a furnace.

*Area E.*—The empty fired shell moulds are filled with molten metal.

*Area F.*—The cast objects so formed are removed when the metal has set, the shell mould being destroyed and the conveyor returning to Area A.

Figure 3:
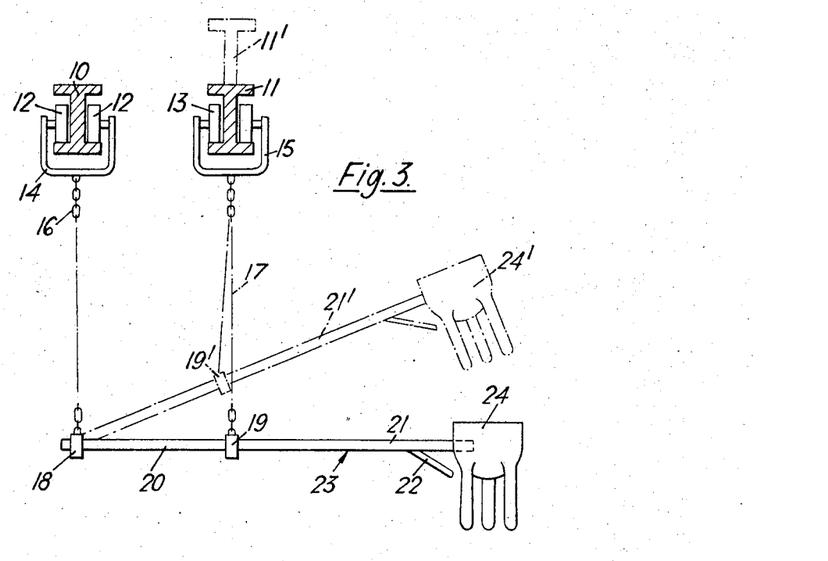
FIGURE 3 is a diagrammatic view of part of conveying apparatus forming part of the apparatus shown in FIGURE 2.

The conveyor for transporting the expendable wax patterns and shell moulds through the apparatus is shown in cross section in FIGURE 3, and comprises two spaced rails 10, 11 of "I" section, along which run pairs of wheels 12, 13 attached to U-shaped frames 14, 15, respectively. Attached respectively to the lowermost part of the U-shaped frames 14, 15 are two chains 16, 17 having lower ends 18, 19 respectively. A common rod 20 is attached to the chains 16, 17 at their lower ends 18, 19.

The rod 20 has an end 21 to which there is attached a subsidiary arm 22, the rod 20 and subsidiary arm 22 together constituting a bifurcated support device 23.

As shown in FIGURE 3, there is attached to the end 21 of the rod 20, an expendable wax pattern 24. It will be seen that the subsidiary arm 22 is spaced from the wax pattern 24.

In order to raise or lower the end 21 of the rod 20, and thus raise or lower the expendable wax pattern 24, (or its shell mould, to be described hereinafter), the vertical position of the rails 10, 11, is varied. Thus, as shown in FIGURE 3, by raising the rail 11 to a position 11', the lower end 19 of the chain 17 is raised to a position 19' and the end 21 of the rod 20 is raised to a position 21', such that the expendable wax pattern 24 is raised to an elevated position 24'. Similarly by lowering the rail 11, the expendable wax pattern 24 can be lowered. In these instances, the rod 20 effectively pivots about the lower end 18 of the chain 16, and the rail 10 is not moved. However, movement of the end 21 of the rod 20 can also be effected by leaving the rail 11 stationary and moving the rail 10 vertically by the desired amount. Again, both rails 10 and 11 may be moved vertically in order to achieve the desired vertical movement of the end 21 of the rod 20.

Figure 10:
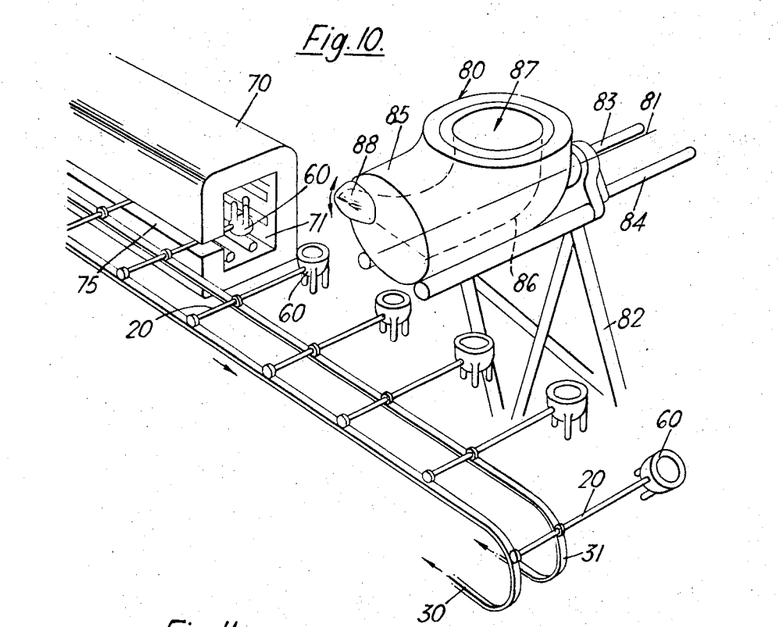
FIGURE 10 is a general view of a further part of the apparatus of FIGURE 2, showing the furnace of FIGURES 7 to 9 and a melting furnace for melting the metal, to be cast.

In order to simplify the drawings, the components 10–17 of the conveyor system just described are not shown in any figure except FIGURE 3. Although the overhead rail system described with reference to FIGURE 3 is to be preferred, it will be appreciated that many alternative systems could be used and in some of the other figures accompanying the present specification, the means for conveying the rods 20, is, when shown, shown as comprising two continuous belts 30, 31, to which the rods 20 are attached (see for example FIGURE 10). The continuous belts 30, 31 are supported by static structure (not shown) from the ground, and vertical displacement of the ends 21 of the rods 20 can be effected by suitably displacing belt 30 or 31 vertically.

The expendable wax patterns 24 are produced in an automatic wax injection machine 40 at Area A from a wax having a melting point in the range 60–65° C. Means (not shown) are provided for ensuring that each wax pattern has a hollow interior. By forming the patterns in this way, room is provided for the wax to expand inwardly under the action of heat (e.g. when the wax is being melted out of the shell moulds). Thus outward expansion is reduced, and the likelihood of fracturing the fragile shell moulds is reduced.

As the wax patterns are produced one after the other, in a substantially continuous stream, they are attached to the end 21 of each rod 20 by embedding the end 21 into the expendable wax pattern (e.g. manually or by injection). The expendable wax patterns 24 on the end of each rod 20 are then conveyed to Area B where shell moulds 60 are formed about the expendable patterns. A shell-mould-making machine comprises three identical stages, each stage comprising a dipping bath 41 and a dusting chamber 42. The level of the liquid in the dipping baths 41 is such that the top of each expendable wax pattern 24 is not wetted by the said liquid, whereby to permit subsequent melting of the wax out of the shell mould.

Each dipping bath 41 comprises a bath of a refractory slip of comminuted refractory material suspended in a refractory binder, such as ethyl silicate. Each dusting machine 42 (shown in more detail in FIGURES 4 and 5) comprises a rotatable hollow wheel 43 having a rim 44 against which are disposed buckets 39. The hollow wheel 43 is rotated about a shaft 45. A hopper 46 supplies refractory material 47 to the internal surface of the rim 44. From the uppermost portion 50 of the wheel 43, the refractory material 47 leaves the internal surface of the rim 44, and falls under gravity onto a sieve 51 and thence vertically downwards onto a chute 52 and thus to the lowermost portion 53 of the wheel 43. In falling vertically between the sieve 51 and the chute 52, the refractory material 47 forms a shower of refractory material through which the expendable wax patterns 24 are passed after being dipped in the baths 41. From the lowermost portion 53, the material is transferred to the uppermost buckets 39.

Figures 4, 5:
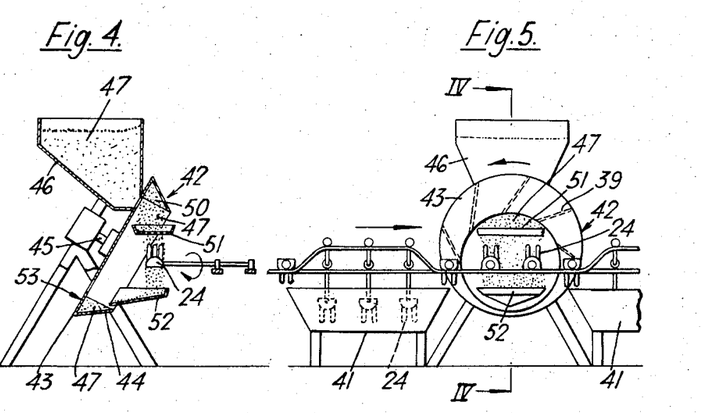
FIGURES 4 and 5 are views of part of the apparatus of FIGURE 2, for forming shell moulds about expendable patterns, FIGURE 4 being a view on line IV—IV of FIGURE 5, FIGURES 6 and 7 are views of further parts of the apparatus of FIGURE 2, for dewaxing and firing the shell moulds, FIGURE 6 being a view on line VI—VI of FIGURE 7, FIGURES 8 and 9 are more detailed views of the furnace shown in FIGURE 7, FIGURE 8 being a view on line VIII—VIII of FIGURE 9.

As will be seen from FIGURES 4 and 5, the expendable wax patterns 24 may be turned upside down during passage through the falling refractory material to ensure that each expendable wax pattern 24 becomes completely covered with refractory material, except for the top portion thereof which is not wetted in the dipping baths 41. The rotation of the expendable wax pattern 24 is effected by rotation of the rod 21 by means not shown.

After passing through the three baths and dusting machines 41, 42 respectively, each expendable wax pattern 24 is covered with three layers of refractory material which together form a shell mould 60.

The shell moulds 60, together with the expendable wax patterns 24 around which they have been formed, are then conveyed to a de-waxing bath at Area C. The de-waxing bath (best shown in FIGURE 6) comprises a tank 61, divided by a wall 62 into a main compartment 63 and a subsidiary compartment 64. A conduit 65 connects the lower ends of the main and subsidiary compartments 63, 64, together. A pump 66 in the conduit 65 pumps water from the subsidiary compartment 64 into the main compartment 63. Heaters 67 are provided in the lower end of the main compartment 63 and serve to heat the water within the main compartment 63 to boiling point. Due to the circulation caused by the pump 66, there is a continuous flow of boiling water over the wall 62 from the main compartment 63 into the subsidiary compartment 64.

Figure 6:
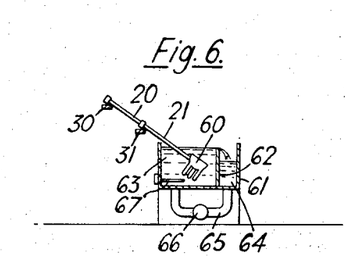

To remove the wax from each shell mould 60, the shell moulds 60 are plunged into and then withdrawn from the boiling water within the main compartment 63, the expendable wax pattern 24 being thus caused to melt since it has a melting point (e.g. 60–65° C.) substantially below that of boiling water. All the wax melted out of the shell moulds 60 can be readily recovered by this process, since it remains at the surface of the boiling water in the main compartment 63, and can thus be scraped off. In the particular embodiment described, the flow of boiling water over the wall 62 causes the melted wax floating on top of the water within the main compartment 63, to accumulate adjacent the wall 62, and this melted wax can then be readily removed.

Figure 8:
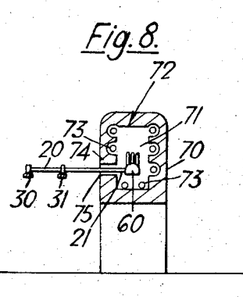
Figure 9:
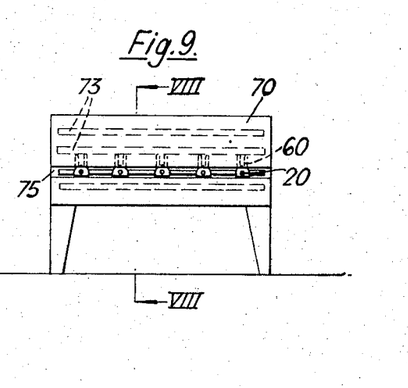

The de-waxed shell moulds 60 are then passed through a firing tunnel constituted by a furnace 70. The furnace 70 (best shown in FIGURES 7, 8 and 9) comprises an elongated chamber 71 bounded by walls 72 within which are embedded electrical heating elements 73. The electrical heating elements 73 emit a major portion of the energy supplied to them as radiant heat. Gas heaters may also be used in furnace 70, and may provide much more rapid heating.

Figure 7:
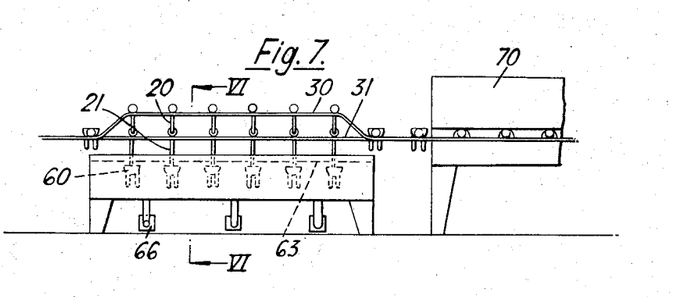

One wall 74 of the furnace 70 is provided along its whole length with a slot 75 through which the rods 20 project into the chamber 71.

After being fired by passing through the furnace 70, the fired shell moulds 60 are conveyed to a casting unit at Area E which includes a melting furnace 80. The melting furnace 80 (best shown in FIGURES 10, 11 and 12) is rotatably mounted about an axis 81 on a trestle support 82. Handles 83, 84 may be provided by which the melting furnace 80 can be rotated about axis 81 but of course any means for rotating the melting furnace 80 about axis 81 can be employed.

Figure 11:
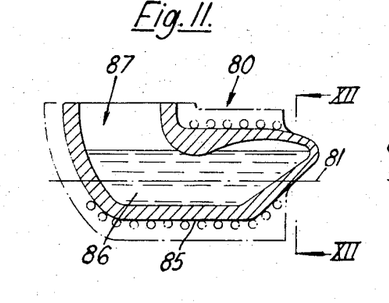
FIGURES 11 and 12 are views of the melting furnace of FIGURE 10, FIGURE 12 being a view of line XII—XII of FIGURE 11.
Figure 12:
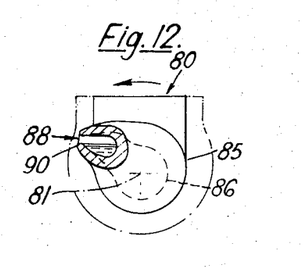

The melting furnace 80 has an outer casing 85 having therewithin a melting chamber 86. The melting chamber 86 is substantially cylindrical having its axis of symmetry coincident with the axis 81. The melting chamber 86 is provided at one end with a vertically extending tunnel 87 which constitutes an inlet to the melting chamber 86. Charges of solid metal are introduced (by means not shown) into the melting chamber 86 through tunnel 87. The other end of the melting chamber 86 terminates in an orifice 88 which constitutes an outlet from the melting chamber 86 for molten metal.

The melting chamber 86 is kept charged with metal such that the level of molten metal within the melting chamber 86 is just below a lower lip 90 of the orifice 88 when the melting furnace 80 is in a rest or neutral position (as shown in FIGURES 11 and 12). It will be appreciated that, by rotating the furnace 80 about the axis 81, very little movement will be required before molten metal flows over the lip 90 and out through the orifice 88. Also such rotational movement as is needed will require relatively little energy because the greater part of the mass of molten metal contained within the melting chamber 86 does not have to be moved since its centre of gravity is coincident with the axis 81. Thus only the inertia of the mass of the melting furnace outer casing 85 and the friction of the supporting bearings has to be overcome in rotating the melting furnace 81.

It will be appreciated that, due to the special design of the melting furnace 81, very little slopping and movement of the molten metal within the furnace is effected.

The shell moulds 60, when filled with molten metal from the melting furnace 80 are conveyed on the rods 20 further along the apparatus whilst the molten metal in the shell moulds 60 sets. As the molten metal sets, it shrinks and the shell moulds 60 fracture and fall away from the setting metal. Finally, when set, the cast objects fall from the rods 20 which are then returned to Area A of the apparatus for passage through the apparatus once more.

Whilst the molten metal is setting within the shell moulds 60, hot metal riser bars within the shell moulds 60 are clipped off and returned whilst still hot to the melting furnace 80 for re-melting and re-use.

It will be appreciated that throughout the process of substantially continuously forming cast objects by the apparatus as hereinbefore described, the same rod 20 is used for supporting each expendable wax pattern 24, and its shell mould 60, throughout the whole process. Thus, initially, the end 21 of each rod 20 is embedded in the wax of the expendable pattern and when the shell moulds 60 is formed around the expendable pattern 24, refractory material also flows around the end 21 and subsidiary arm 22, such as to cover these with the shell mould material. When the expendable wax pattern 24 is melted out of the shell mould 60, the shell mould 60 remains attached to the end 21 and subsidiary arm 22 of the bar 20, and when the molten metal from the melting furnace 80 is poured into the shell mould 60, the subsidiary arm 22 serves to reinforce the support given by the end 21 of the bar 20 to the shell mould 60, such as to prevent the shell mould 60 from collapsing or from being wrenched from the end 21.

The shell mould material formed around the end 21 of the rod 20 and the subsidiary arm 22 also serves to shield these components from the heat of the furnace 70 during the firing of the shell moulds 60.

If when a shell mould 60 collapses and fractures as the molten metal sets at the end of the process, some of the shell mould 60 remains attached to the bar 20 or subsidiary arm 22, then this remaining shell mould material can be readily removed by mechanical vibration.

Figures 13, 13A, 14:
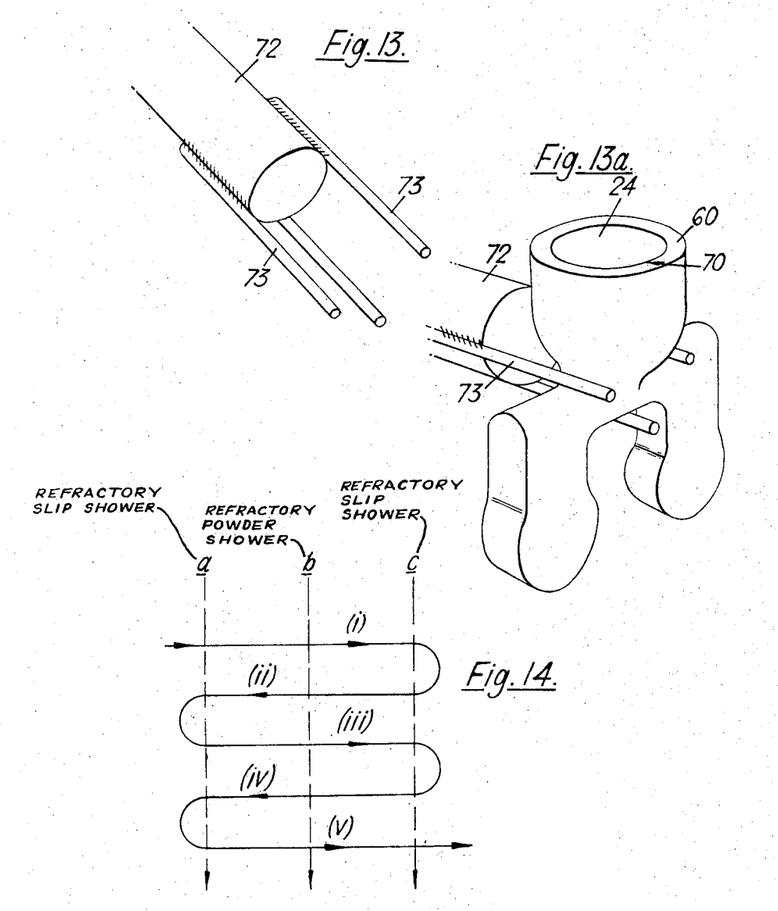
FIGURE 13 is a general view of part of an alternative form of support device for use with the apparatus of FIGURES 2 and 3.
FIGURE 13a is a view showing the manner in which the support device of FIGURE 4 is used to support a shell mould.
FIGURE 14 shows an alternative method of forming the shell moulds about the expendable patterns.

Alternative support devices for the expendable patterns and their shell moulds are illustrated in FIGURES 13 and 13a. Each support device comprises a bar 72 formed of a nickel-based alloy such as that sold under the trademark "Nimonic." Each bar 72 has three rods 23 secured to one end. The rods 23 (which may be made of the material sold under the trademark "Stellite"), are so arranged that they form convenient supporting means for expendable wax patterns 24 and/or the surrounding shell moulds 60.

Yet a further support device (not illustrated) could be provided by a single bar, initially vertically disposed, and projecting into the expendable pattern 24 at its top surface i.e. as seen in FIGURE 13a such a bar would project out of the top 70 of the pattern 24. The bar would thus be spaced from shell mould 60 and, when the wax is melted from the mould e.g. by hot bath dipping, the bar would leave the mould unsupported, further supporting means then being provided for the mould. Such supporting means may be provided by the hearth bricks 163 described below.

FIGURE 14 illustrates a general arrangement for forming shell moulds 60 in a compact space. It will be appreciated that the arrangement illustrated in FIGURES 2 (Area B) 4 and 5 is very large. The arrangement illustrated in FIGURE 14 may provide the patterns 24 with five or more coatings within a relatively small space by placing the components as shown. The patterns 24 are caused to execute multiple S-shaped paths passing through three showers of material a, b and c. Showers a and c are of refractory slip and shower b is of refractory powder. The top portions of the patterns 24 are provided with masks (e.g. of paper) to prevent the said top portions from being coated with the refractory slip. It will be appreciated that the patterns will be provided with a fresh coat of slip plus powder at each of the positions (i), (ii), (iii), (iv) and (v) as they pass alternately through showers a, b and c.

Figures 15, 16:
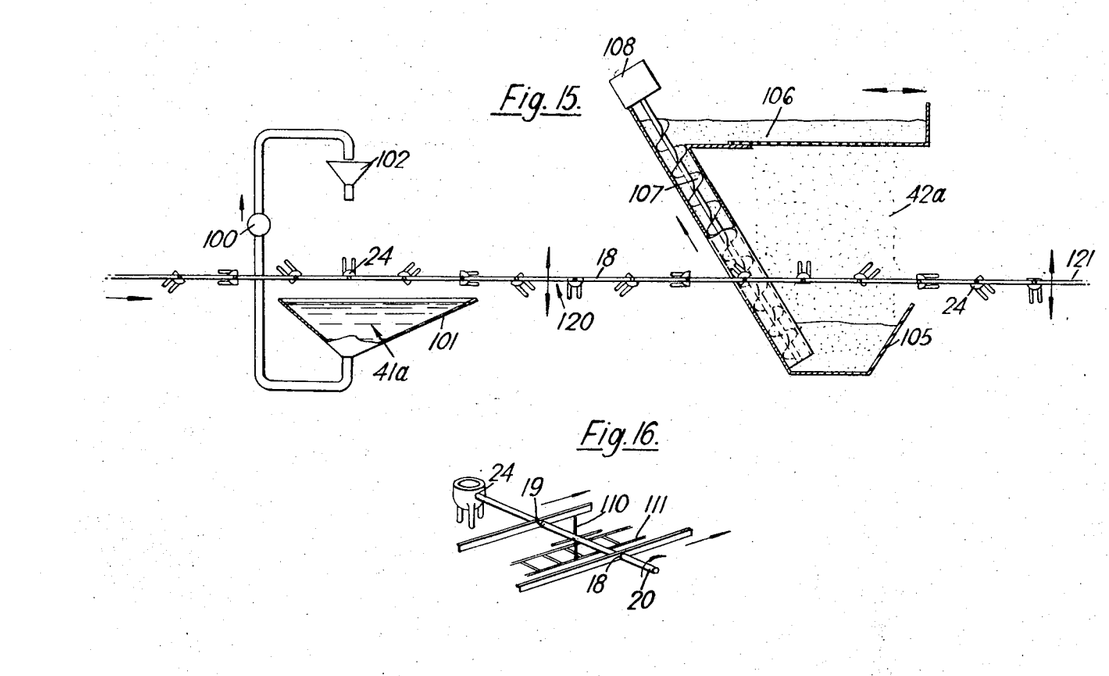
FIGURE 15 shows yet further apparatus for forming shell moulds about the expendable patterns.
FIGURE 16 illustrates an alternative form of conveying equipment, for use with the apparatus of FIGURE 15.

Turning to FIGURES 15 and 16, there is shown another alternative arrangement for the apparatus disclosed in Area B of FIGURE 1, and shown in more detail in FIGURES 4 and 5, for making the shell moulds 60 about the expendable patterns.

Again the shell mould forming machine comprises three identical stages, only one of which is shown in FIGURE 15. Each stage comprises a dipping bath 41a and a dusting chamber 42a.

The dipping bath 41a comprises a bath 101 of refractory slip of comminuted refractory material suspended in a refractory binder. The slip is pumped by a pump 100 from the bath 101 to a funnel 102 disposed vertically above bath 101. The expendable patterns 24 are passed between the bath 101 and funnel 102 and so are showered in the slip, thus becoming completely covered except at their portions adjacent the support which carries them, where they may be covered with a mask (e.g. of paper). The dipping bath 41a travels along with each expendable pattern 24 in turn until the latter is suitably covered and then returns to its starting position and proceeds with the next cycle.

From the dipping bath 41a, the coated expendable pattern passes to the dusting chamber 42a. This comprises a lower vessel 105 from which refractory material is transferred to an upper vessel 106 by a screw lift 107. The screw lift is operated by a motor 108.

The upper vessel 106 is vibrated by the motor 108 and is provided in its lower surface with apertures through which the refractory powder is shaken. The powder falls vertically into the lower vessel 105, thus providing a shower of powder through which the coated expendable patterns 24 are passed to be covered in the powder. The patterns 24 are then passed on to the next identical stage of the machine.

In passing through the apparatus shown in FIGURE 15, the patterns 24 are continuously rotated about the rod supporting them. This rotation can be achieved with the device shown in FIGURE 16, in which the supporting rod 20 is provided with a set of four vanes 110 which cooperate with a static rack 111 to form a "rack and pinion" connection. Thus as the patterns travel over the rack, they are also rotated.

To prevent excess refractory slip or powder accumulating on the patterns 24 in their passage through the apparatus of FIGURE 15, the patterns may be vibrated vertically at the points 120, 121 i.e. at the exit from each stage of the process.

Yet a further alternative method of dusting the patterns with refractory powder after they have been suitably covered in refractory slip, is to use a "fluidised bed" of the refractory powder, into which the wet patterns may be dipped. Thus the refractory powder may be contained in a tank into the bottom of which compressed air is fed to thereby "fluidise" the powder. The patterns, wet after dipping in the slip, can be placed in the fluidised powder and thereby become coated. The process can be repeated to build up the necessary coatings.

Figures 17, 18:
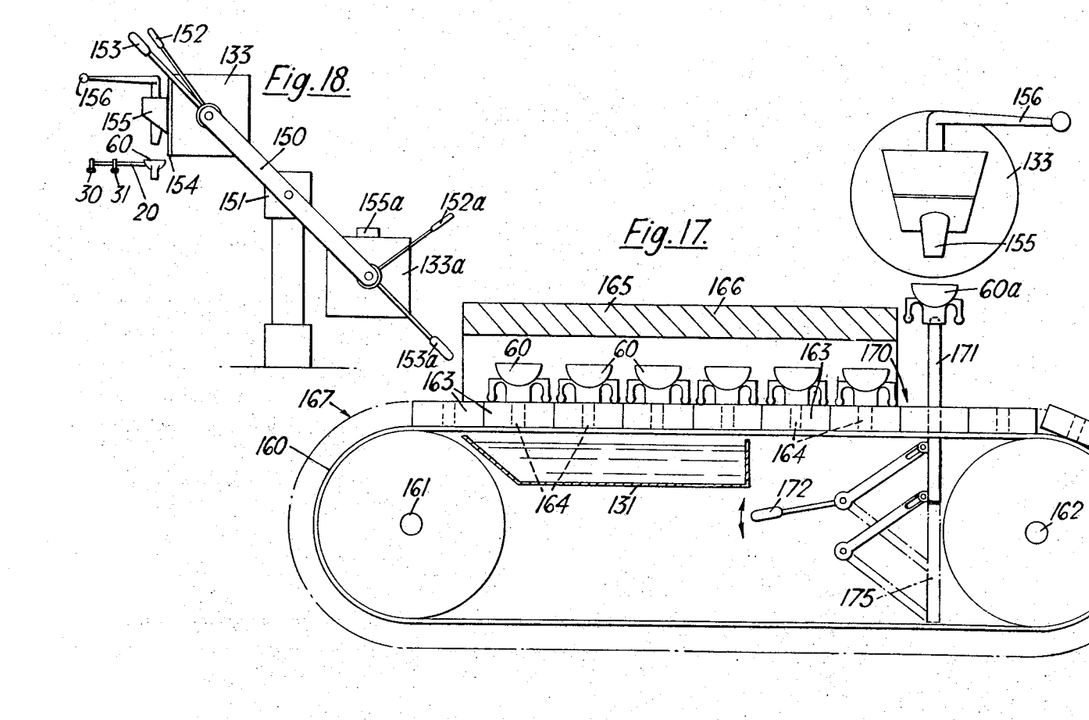
FIGURE 17 illustrates an alternative pattern-melting, shell mould-firing and casting arrangement.
FIGURE 18 illustrates an alternative form of melting furnace.

An alternative form of pattern-melting, shell-firing and metal-casting apparatus i.e. to replace the apparatus in Areas C, D and E of FIGURE 2 is shown in FIGURE 17. As shown, an endless belt 160 is provided with a plurality of hearth bricks 163 having holes 164 provided therein.

Enclosing the top and sides of the moving belt 160 is a linear elongated casing 165 within which is disposed a furnace 166. The hearth bricks 163, which are at any moment disposed adjacent the elongated linear casing 165, constitute the base of the furnace 166. The expendable wax patterns 24, surrounded by their shell moulds 60, are introduced at 167 to the belt 160, one being placed on each of the hearth bricks 163 in an upright position. Although not shown in FIGURE 17, each shell mould is still supported by a supporting arm, as, for example, shown in FIGURES 3 to 13 and 13a.

The shell moulds 60 for use in this particular apparatus are somewhat different from those used in the apparatus previously described in that, in addition to the apertures in the tops of the moulds, further apertures (not shown) are provided in the lowermost parts of the shell moulds 60. These further apertures are situated over the holes 164 provided in each hearth brick 163.

The furnace 166 is provided with gas or electric burners (not shown) which keep the temperature at above 1000° C. Disposed adjacent the furnace 166 but below the moving belt 160 is a water tank 131.

Upon movement of the belt 160, the expendable wax patterns 24 surrounded by their shell moulds 60 are introduced into the furnace 166 where the wax of the expendable pattern 24 is melted and flows through the holes 164 into the water tank 131. Further movement of the shell moulds 60 through the furnace 166 causes the shell moulds 60 to be fired and the fired shell moulds emerge from the furnace 166 at 170.

At this position, a plug 171 is, upon actuation of a lever 172, pushed through the respective hole 164 until it enters and fills the aperture provided in the lowermost part of the shell mould 60. Further movement of the plug 171 raises the empty shell mould 60 to an elevated position as shown at 60a, in which it is adjacent a melting furnace 133. Operation of a valve handle 156 allows a valve 155 on melting furnace 133 to pass a predetermined quantity of molten metal into the shell mould 60. The lever 172 is then returned to a rest position in which the plug 171 is returned to its lower position shown in dotted lines at 175 in FIGURE 17, the filled shell moulds 60 being replaced on the hearth brick 164. The conveyor belt 160 is then moved a further place, and the operation is repeated with the next shell mould 60, the previously filled shell moulds 60 being removed from the belt.

In the apparatus described with reference to FIGURE 17, the motion is not continuous but is intermittent. However, the relation between the rest periods in which the shell moulds 60 are introduced as at 167 and further shell moulds as at 70 are filled with molten metal and the operating periods, in which the belt 60 moves, is such that the operation is substantially continuous. During the operating periods, the shell moulds 60 are rapidly introduced into the furnace, to ensure that a small layer of the wax, forming part of the expendable wax patterns 24, is melted before the wax has time to expand and crack the relatively thin shell moulds 60.

An alternative form of melting furnace is illustrated in FIGURE 18. In this arrangement two melting furnaces 133, 133a are used. These furnaces are pivotally mounted at either end of a supporting bar 150 which is pivotally mounted at its centre on a supporting block 151. The melting furnaces 133, 133a are respectively provided with furnace tilting handles 152, 152a with which the furnaces may be pivoted about the bar 150.

When being charged or recharged, the furnace 133 or 133a is disposed in its normal vertical position, as is the melting furnace 133a in FIGURE 18, and fresh metal is introduced into the furnace. Heat is supplied by heating elements (not shown) within the furnace or is induced by high frequency alternating current, and the metal is melted. The melting furnace 133 or 133a is then lifted from its said normal vertical position by moving handle 153, or 153a rigidly attached to the support bar 150, whereby the furnace is brought to an elevated position such as that occupied by melting furnace 133 in FIGURE 18. A pre-heated valve plate 154, having fixed thereto a valve 155, is attached to the upper surface of the melting furnace when it is in the position shown by furnace 133a and the furnace is then tipped through 90° to the position as shown by melting furnace 133 in FIGURE 18. In this position the valve 155 is situated vertically above the position occupied by an empty shell mould 60 on the conveyor system. Operation of a valve handle 156 actuates the valve 155 which is normally retained adjacent a valve seating (not shown) by a spring (not shown) and permits a predetermined quantity of molten metal to be poured from the melting furnace 133 or 133a into the waiting shell mould 60 past the valve 155. The valve 155 may be provided with a central bore through which water or air is passed for cooling purposes.

Should a valve 155 not function, the melting furnace is returned to its normal vertical position and the valve plate 154 replaced with a further pre-heated valve plate.

Whilst one melting furnace is being used for filling the empty shell moulds 60, the other furnace, which is in its said normal vertical position, is recharged and effects melting of the new charge of metal introduced. Thus with this arrangement a supply of molten metal is always available for filling the empty shell mould 60 and thus the casting process need not be held up while a fresh charge of metal is melted by the melting furnace.

In a typical installation using a 120 k.v.a. generator, supplying both melting furnaces it should be possible to melt metal at over 4 lbs. per minute, giving a pouring rate of 1 lb. casting every 15 seconds.

If electrical heating elements are used in any of the melting furnaces described above, melting of the metal is preferably effected using high frequency elements, the temperature being controlled by a thermostatic control device. An alternative control device can be used in which the temperature is controlled by adding a predetermined amount of cold recharge metal whilst maintaining a continuous input of high frequency electrical energy.

It will be appreciated that with the present invention there is provided a method and apparatus for substantially continuously casting objects one after the other by the expendable pattern process. Compared with the conventional expendable pattern process, in which batches of models are cast, the present method and apparatus provides many advantages. Thus with the batch method of casting much time and labour is spent in assembling and dissembling the batches of models and castings, and also, since such handling is necessary, the shell moulds need to be quite substantial to withstand the knocks taken. With the present invention the substantially continuous production of castings avoids the necessity to assemble and disassemble patterns and castings, casting time is substantially reduced, and, since the shell moulds 60 need not be handled to such a great extent, they can be made substantially thinner. Indeed, the shell moulds 60 need only be thick enough to be self-supporting.

Also, with individually made castings, finer control is possible than with long and complicated casting assemblies usually associated with "batch" methods of production. Less variation in shrinkage and dimensions, for example, are obtainable with the present process.

With the particular embodiment described above, the apparatus can be considered as comprising distinct units, e.g. the machine 7, the shell mould making machine 8 and the machine 9. Each of these units can be provided with its own set of controls, thus providing means for individually controlling each step of the process. This can be of great assistance where a variety of objects is to be cast, since each variety will require a different set of process conditions to obtain the best results.

With the particular form of apparatus described, it would be possible to construct a machine, wherein the overall time from injection of the wax to form the expendable pattern, to the extraction of the final individual casting, is less than one hour. This makes it possible to change the type of component being formed and passing through the machine in a very short time. Again should it be necessary to stop production due to breakdown or the need for maintenance or adjustment, it is not particularly difficult to stop the whole machine.

I claim:

1. Apparatus for forming cast objects comprising forming means for forming expendable patterns of the objects to be formed, a mould-forming machine which receives said expendable patterns and which has means for dipping the expendable patterns into a refractory slip of comminuted refractory material suspended in a refractory binder, means for removing the expendable patterns from the slip, means for applying a layer of refractory powder to each expendable pattern, said last-mentioned means, comprising a hollow wheel, a substantially horizontal axle about which said wheel is rotatably mounted, a rim for said wheel, buckets disposed against the inside of said rim, said buckets containing the refractory powder and transferring it from the lowest part of the wheel to its uppermost point, the buckets causing the refractory powder to leave the rim when adjacent the uppermost point of said wheel, said powder then falling under gravity, and providing a shower of refractory powder through which the dipped expendable patterns are passed, means for drying the expendable patterns to form shell moulds around each said expendable pattern, melting means for melting out said expendable patterns from said shell moulds, firing means for firing said shell moulds, means for filling with molten metal the fired shell moulds issuing from said firing means, means for removing each cast object from its shell mould when the metal has set, and means for automatically conveying said expendable patterns from said forming means through said mould forming machine, and for automatically conveying said patterns and shell moulds through said melting means and through said firing means.

2. Apparatus for forming cast objects comprising forming means for forming expendable patterns of the objects to be formed, a mould-forming machine which receives said expendable patterns and which has means for substantially continuously dipping the expendable patterns into a refractory slip of comminuted refractory material suspended in a refractory binder, means for removing the expendable patterns from the slip, means for applying a layer of refractory powder to each expendable pattern, said last-mentioned means comprising a hollow wheel, a substantially horizontal axle, about which said wheel is rotatably mounted, a rim for said wheel, buckets disposed against the inside of said rim, said buckets containing the refractory powder and transferring it from the lowest part of the wheel to its uppermost point, the buckets causing the refractory powder to leave the rim when adjacent the uppermost point of said wheel, said powder then falling under gravity, and providing a shower or refractory powder through which the dipped expendable patterns are passed, a hopper from which refractory powder is supplied to the wheel, a sieve through which the falling refractory powder passes before reaching the said dipped expendable patterns, and a chute onto which the unused refractory powder falls, the chute directing the unused refractory powder to the lowermost part of the wheel, to be circulated again for further use, means for drying the expendable patterns to form shell moulds around each said expendable pattern, melting means for melting out said expendable patterns from said shell moulds, firing means for firing said shell moulds, means for filling with molten metal the empty, fired shell moulds issuing from said firing means, means for removing each cast object from its shell mould when the metal has set, and means for automatically conveying said expendable patterns from said forming means through said mould forming machine and for automatically conveying said patterns and shell moulds through said melting means and through said firing means.

3. Apparatus for forming cast objects comprising forming means for forming expendable patterns of the objects to be formed, mould-forming means for substantially continuously forming shell moulds about said expendable patterns, a bath of liquid comprising a tank, a wall dividing said tank into a main and a subsidiary compartment, a heater for maintaining the liquid in the main compartment, into which the shell moulds are plunged to melt out the expendable patterns, at a temperature above the melting point of the expendable pattern material, and a pump which continuously circulates the liquid between the main and subsidiary compartments by pumping the liquid into the main compartment adjacent the bottom thereof, the hot liquid leaving said main compartment by spilling over said wall into said subsidiary compartment, and means for dipping said expendable patterns, in their shell moulds, into said liquid to melt said expendable patterns out of said shell moulds, firing means for firing said shell moulds, means for filling with molten metal the succession of empty, fired shell moulds issuing from said firing means, means for removing each cast object from its shell mould when the metal has set and means for automatically conveying said expendable patterns from said forming means through said mould-forming means and for automatically conveying said patterns and shell moulds through said melting means and through said firing means.

4. Apparatus for forming cast objects comprising forming means for forming expendable patterns of the objects to be formed, means for forming shell moulds about said expendable patterns, melting means for melting out said expendable patterns from said shell moulds, firing means for firing said shell moulds, a melting furnace for providing molten metal for casting into said shell moulds, said melting furnace comprising a U-shaped melting chamber in which the metal is melted, having one end constituting an inlet through which charges of solid metal are fed to the furnace, and a further end terminating in an orifice which constitutes the outlet for molten metal, a major portion of said melting chamber being substantially cylindrical, having its axis disposed horizontally, closely adjacent with a horizontal axis about which said melting furnace is rotatable, the centre of gravity of the furnace containing molten metal being disposed closely adjacent said horizontal axis, said furnace being rotatable about said horizontal axis between at least two positions, in the first of which the outlet is disposed above the level of the molten metal in the melting furnace, such that no molten metal can flow out of the furnace, and in the second of which the outlet is disposed below the surface of the molten metal in the melting furnace, such that molten metal can flow out of the furnace, means for filling with molten metal the empty, fired shell moulds issuing from said firing means, means for removing each cast object from its shell mould when the metal has set, and means for automatically conveying said expendable patterns from said forming means through said mould-forming means and for automatically conveying said patterns and shell moulds through said melting means and through said firing means.

5. A method of forming cast objects comprising the following steps:
   (a) forming expendable patterns of the objects to be formed,
   (b) attaching each expendable pattern to a support device by embedding the support device in the expendable pattern,
   (c) passing said expendable patterns through means which forms a shell mould about each said pattern and over said support device,
   (d) passing said expendable patterns, with their shell moulds, through melting means for melting out the expendable pattern from each said shell mould, the empty shell mould remaining attached to said support device,
   (e) passing said succession of empty shell moulds through firing means for firing said shell moulds,
   (f) filling the empty, fired shell moulds with molten metal, and
   (g) removing each shell mould from its cast object when the metal has set, the support device, which is the only direct means of support for said expendable pattern and its shell mould used throughout said method, also being detached with said shell mould.

6. A method of forming cast objects comprising the steps of (a) making expendable patterns of the objects to be formed, (b) attaching each expendable pattern to a support device, (c) forming an integral shell mould about each said pattern and over the support device, (d) melting out the expendable pattern from each shell mould and fixing the shell moulds while the latter remain attached to the support device, (e) filling the empty, fired shell moulds with molten metal, and (f) removing each shell mould and support device from its cast object after the metal has set.

7. A method as claimed in claim 6 in which each of the said steps is performed substantially immediately after the preceding step has been completed.

8. A method as claimed in claim 6 in which each shell mould is filled with molten metal by introducing a predetermined quantity of charging metal into a melting furnace, the charging metal displacing molten metal from the melting furnace into each shell mould in an amount sufficient to fill each shell mould.

9. Apparatus for forming cast objects comprising means for making expendable patterns of the objects to be formed, means for attaching each expendable pattern to a support device, means for forming an integral shell mould about each said expendable pattern and over the support device, means for melting out the expendable pattern from each shell mould and for firing the shell moulds while the latter remain attached to the support device, means for filling the empty, fired shell moulds with molten metal, and means for removing each shell mould and support device from its cast object after the metal has set.

10. Apparatus as claimed in claim 9 in which there are means for providing the expendable patterns with hollow interiors.

11. Apparatus as claimed in claim 9 in which there are two furnaces in which casting metal is melted, one of said furnaces being adapted to be used for pouring molten metal into each shell mould, while the other is adapted to be recharged with metal which is to be melted.

References Cited

UNITED STATES PATENTS

| | | | |
|---|---|---|---|
| 2,146,293 | 2/1939 | Gammeter | 18—2 |
| 2,242,732 | 5/1941 | Ulrich | 18—2 |
| 2,528,571 | 11/1950 | Babcock | 22—82 |
| 2,932,864 | 4/1960 | Mellen | 22—196 |
| 2,960,735 | 11/1960 | Whitesell | 22—20 |
| 2,961,751 | 11/1960 | Operhall et al. | 22—196 |
| 3,010,852 | 11/1961 | Prange et al. | 22—169 |
| 3,165,799 | 1/1965 | Watts | 22—196 |
| 3,171,174 | 3/1965 | Mellen et al. | 22—87 |
| 3,174,737 | 3/1965 | Olsson | 22—82 |

FOREIGN PATENTS 221,868  6/1959  Australia.

J. SPENCER OVERHOLSER, *Primary Examiner.*

E. MAR, *Assistant Examiner.*